United States Patent [19]

Schultze et al.

[11] 4,032,613

[45] June 28, 1977

[54] REMOVAL OF IRON FROM ALUMINUM NITRATE

[75] Inventors: Lawrence E. Schultze, Sparks; Donald J. Bauer, Reno; Judith A. Eisele, Verdi, all of Nev.

[73] Assignee: The United States of America as represented by the Secretary of the Interior, Washington, D.C.

[22] Filed: Dec. 9, 1975

[21] Appl. No.: 639,024

[52] U.S. Cl. .............................. 423/112; 423/139; 423/395; 75/101 BE; 75/121
[51] Int. Cl.² .......................................... C01F 7/66
[58] Field of Search ................. 423/112, 139, 395; 75/101 BE

[56] References Cited

UNITED STATES PATENTS

| | | | |
|---|---|---|---|
| 3,144,304 | 8/1964 | Nagumo et al. | 423/112 |
| 3,211,521 | 10/1965 | George et al. | 423/139 |
| 3,240,561 | 3/1966 | Brown | 423/112 |
| 3,240,562 | 3/1966 | Brown et al. | 423/112 |
| 3,320,032 | 5/1967 | Feller | 423/139 |
| 3,586,476 | 6/1971 | Beutner et al. | 423/139 |
| 3,586,477 | 6/1971 | Flood | 423/139 |
| 3,586,481 | 6/1971 | Hyde et al. | 423/112 |
| 3,758,566 | 9/1973 | Organ | 423/139 |
| 3,816,590 | 6/1974 | Huska et al. | 423/112 |

Primary Examiner—Herbert T. Carter
Attorney, Agent, or Firm—William S. Brown; Donald A. Gardiner

[57] ABSTRACT

Iron is removed from concentrated aluminum nitrate solution by solvent extraction with tri-n-butyl phosphate.

2 Claims, No Drawings

REMOVAL OF IRON FROM ALUMINUM NITRATE

Production of alumina from ores or clays conventionally involves an initial leach with a mineral acid, such as nitric acid. The resulting leach liquors, consisting essentially of solutions of the corresponding aluminum salts, are, however, generally contaminated with iron, e.g., about 1 to 5 percent of iron, which must be largely removed prior to conversion of the aluminum salts to alumina. A variety of prior art processes have been employed for this purpose. These include the process of U.S. Pat. No. 3,211,521, in which the iron is extracted by means of an ion-exchange liquid consisting of an alkyl phosphoric acid in which the alkyl group contains at least 8 carbons. The prior art processes have, however, generally been deficient in terms of efficiency of iron removal, cost, or ease of recovery of the iron from the extractant.

It has now been found, according to the process of the invention, that iron may be readily and efficiently removed from concentrated aqueous solutions of aluminum nitrate by extraction with tri-n-butyl phosphate (TBP). It has been found that, although TBP is a poor extractant for iron at the normal concentration of aluminum nitrate leach liquors, i.e., about 1.5 molar, efficiency of the TBP increases greatly as the concentration of the aluminum nitrate solution increases. Accordingly, the process of the invention is generally practical only as applied to relatively concentrated solutions of aluminum nitrate.

Solutions having aluminum nitrate concentrations of greater than about 50 percent by weight are generally satisfactory for use in the process of the invention. These may be readily obtained from more dilute solutions, such as the above-discussed leach liquors, by any conventional means such as evaporation in air at room temperature, or at temperatures of about 70° to 100° C, or by solar evaporation or evaporation under vacuum.

Concentration of the solutions can be carried to the point where $Al(NO_3)_3 \cdot 9H_2O$ crystals are produced and this is, in fact, the preferred embodiment of the invention. At the melting point of the crystals, which is 70° C, the aluminum nitrate is dissolved in the water of crystallization. The resulting concentration of aluminum nitrate, generally about 56.8 percent, thus represents the maximum practical concentration of aluminum nitrate solution that may be treated according to the process of the invention, as well as being the preferred concentration.

Extraction of the concentrated solutions of aluminum nitrate are generally satisfactory at room temperature, but temperatures as high as about 70° C may be employed. Where the crystals of hydrated aluminum nitrate are to be purified, the temperature must of course be high enough to melt the crystals, as discussed above.

The extractant may consist of TBP per se, or of a solution of TBP in an inert diluent such as kerosine. Where a diluent is employed, the concentration of TBP in the diluent will generally range from about 25 to 90 percent.

The optimum amount of TBP employed in the extraction may vary considerably depending on the concentration of iron in the aluminum nitrate, type of extraction procedure, temperature, etc. However, a weight ratio of TBP to aluminum nitrate of about 0.05:1 to about 1:1 is generally satisfactory. This will usually correspond to volume ratios of TBP to aluminum nitrate solutions of about 0.08:1 to 1.7:1.

Contacting of aluminum nitrate solution and TBP, and subsequent separation of phases, may be by means of any conventional batch or continuous processes such as mixer-settlers, packed columns or baffled columns.

Recovery of the iron from the extractant is also accomplished by conventional means such as stripping with water or with dilute acids such as HCl, $HNO_3$ or $H_2SO_4$. Stripping is readily accomplished at room temperature and by means of processes similar to those used in the initial extraction. Optimum amounts of stripping solution, contact times, etc., will depend on the iron concentration and are readily determined experimentally.

Although the process of the invention is primarily useful for purification of aluminum nitrate solutions, it may also be used for purification of solutions of any aluminum salts that have a low enough melting point to avoid degradation of the organic phase.

The process of the invention will be more specifically illustrated by the following example.

EXAMPLE

A feed consisting of 100 g of $Al(NO_3)_3 \cdot 9H_2O$ and 0.85 g of $Fe(NO_3)_3 \cdot 9H_2O$ was melted at 70° C and extracted at that temperature by contacting with 25 ml of undiluted TBP. The contacting consisted of agitating the molten salt and TBP with a mechanical stirrer.

The TBP was separated from the residue decanting off the cooled, solidified salt, and was stripped by means of contacting with an equal volume of water. Analysis of the residue showed that the extraction reduced the iron content of the feed to less than 0.05 g $Fe(NO_3)_3 \cdot 9H_2O$.

We claim:

1. A process for removal of iron from a concentrated aqueous aluminum nitrate solution, containing about 50 to 56.8 weight percent of aluminum nitrate, consisting of contacting said solution with an extractant from the group consisting of tri-n-butyl phosphate and a solution of about 25 to 90 percent of tri-n-butyl phosphate in an inert diluent, the weight ratio of tri-n-butyl phosphate to aluminum nitrate being about 0.05:1 to about 1:1, whereby the iron is extracted into said extractant.

2. The process of claim 1 in which the aluminum nitrate solution is formed by melting crystals of hydrated aluminum nitrate.

* * * * *